April 8, 1958 A. SALZER 2,829,472
AUTOMATIC DIAMOND CUTTING AND POLISHING DEVICE
Filed Sept. 22, 1953 3 Sheets-Sheet 1
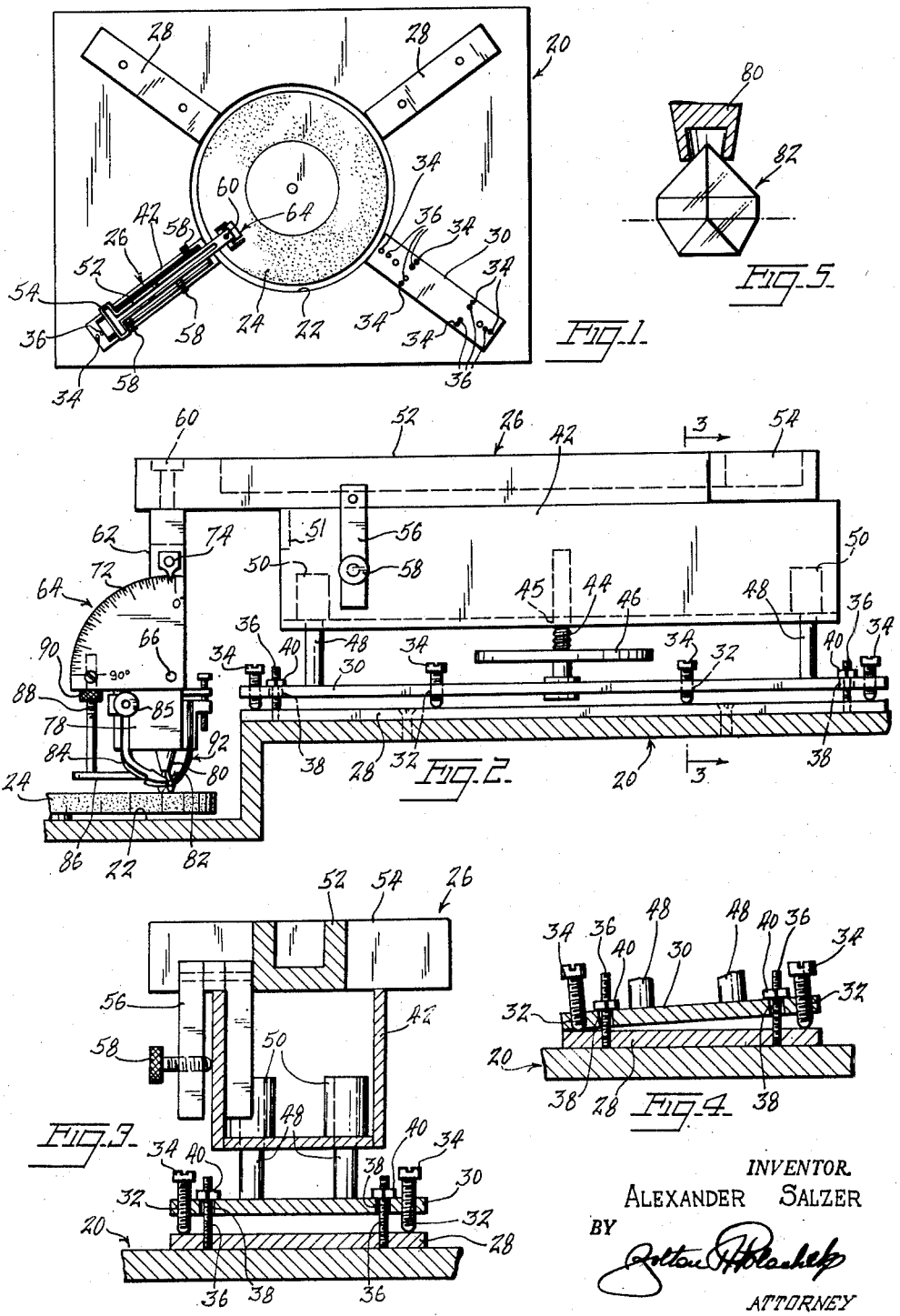
INVENTOR.
ALEXANDER SALZER
BY
ATTORNEY April 8, 1958 A. SALZER 2,829,472
AUTOMATIC DIAMOND CUTTING AND POLISHING DEVICE
Filed Sept. 22, 1953 3 Sheets-Sheet 2
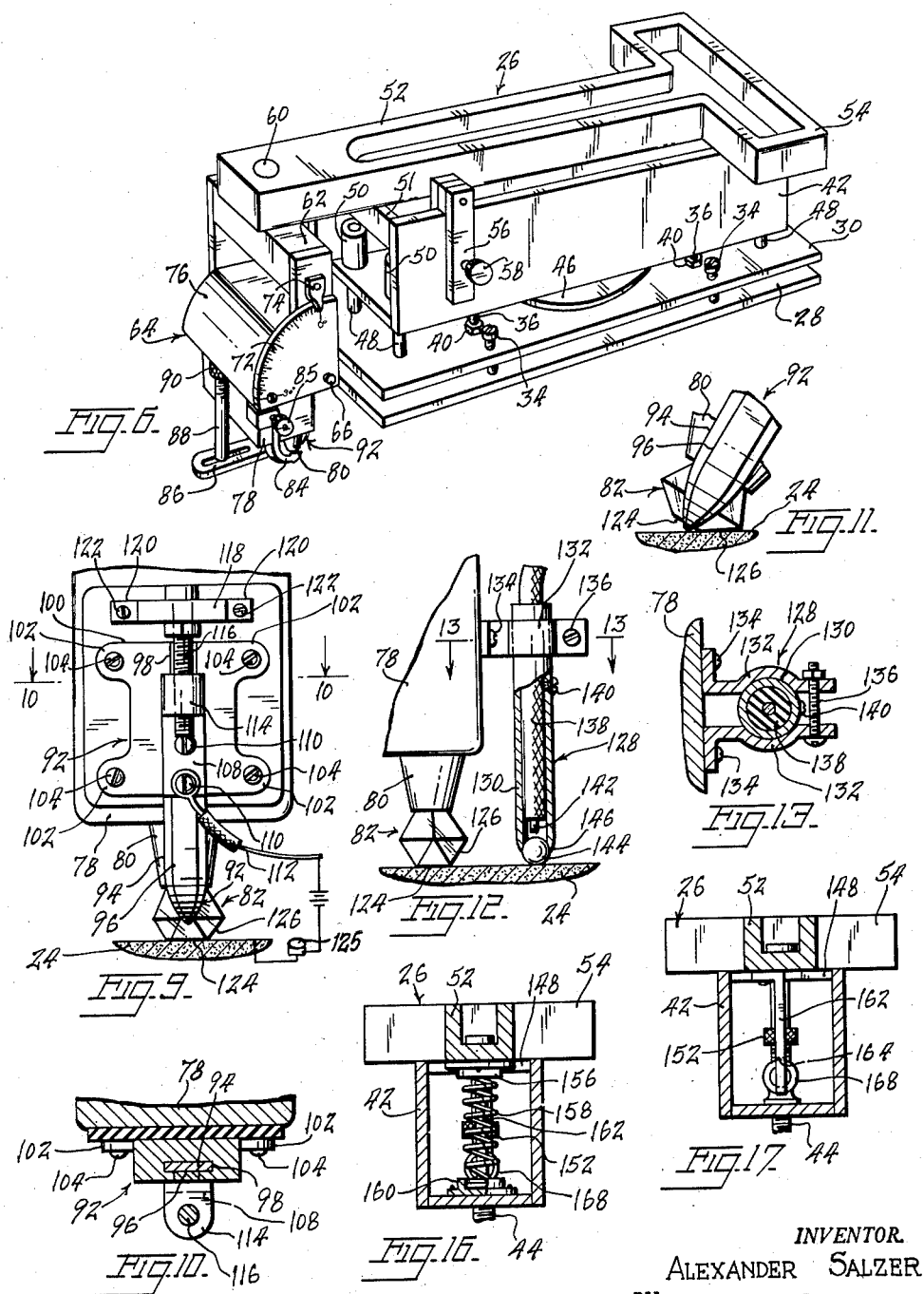
INVENTOR.
ALEXANDER SALZER
BY
ATTORNEY April 8, 1958          A. SALZER          2,829,472
AUTOMATIC DIAMOND CUTTING AND POLISHING DEVICE
Filed Sept. 22, 1953          3 Sheets-Sheet 3
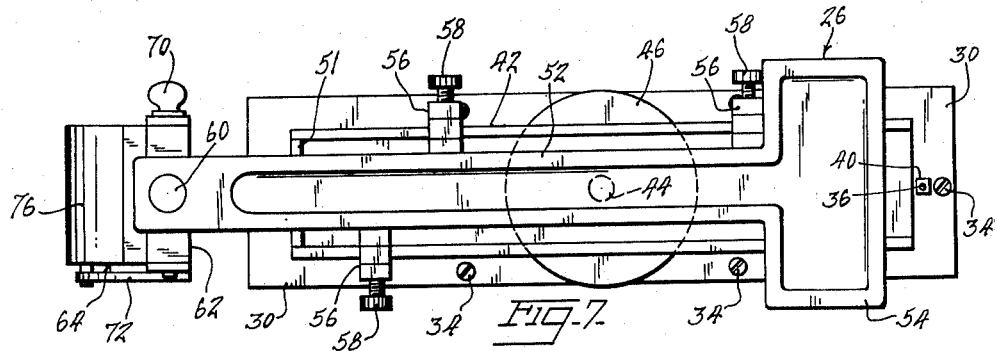
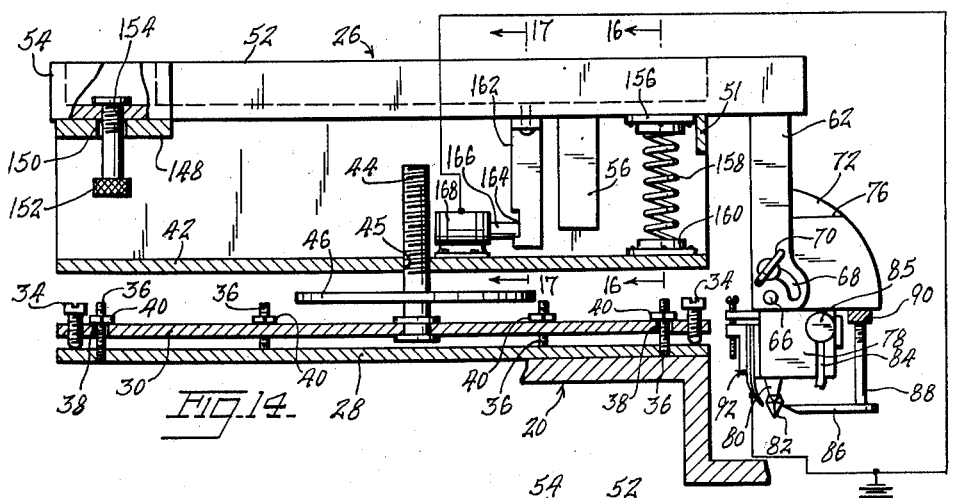
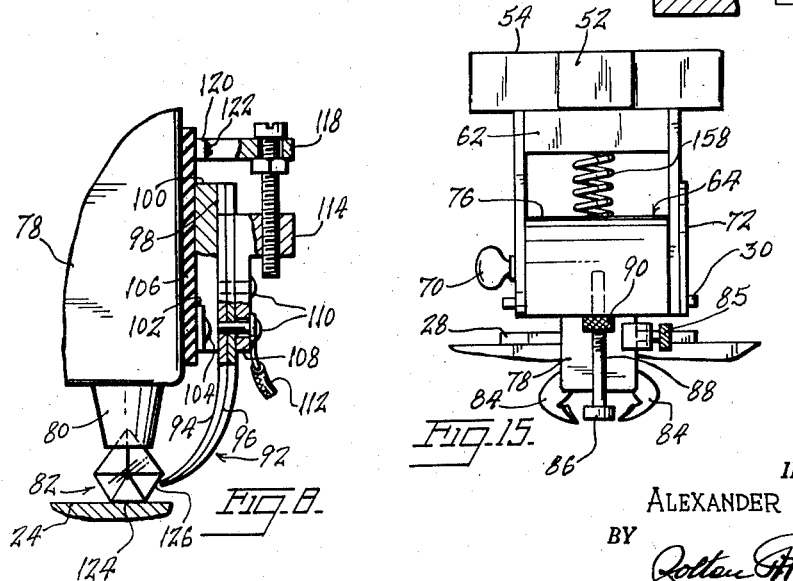
INVENTOR.
ALEXANDER SALZER
BY
ATTORNEY United States Patent Office 2,829,472
Patented Apr. 8, 1958

2,829,472

AUTOMATIC DIAMOND CUTTING AND POLISHING DEVICE

Alexander Salzer, New York, N. Y.

Application September 22, 1953, Serial No. 381,708

7 Claims. (Cl. 51—125)

This invention relates to a machine whereby diamonds can be ground to selected shapes or profiles and, more particularly, has reference to a machine of the character described that will be adapted to signal the completion of a particular step in the grinding operation, as for example, the grinding of the table of the diamond, a selected facet, or some other surface of the stone.

It is an important object of the present invention to provide a machine of the type stated that will permit the extent to which the stone is to be cut to be controlled with complete accuracy, through the medium of a construction wherein the machine can be pre-set to effect cutting to a predetermined extent, with said machine thereafter cutting all stones mounted therein to precisely the same extent, without necessitating resetting of the machine or other adjustments. In this way, it is proposed to provide a machine that will be particularly adapted to quantity production of properly cut stones, and it is further proposed to accomplish this desirable object without complicating the machine construction unduly.

A further object of importance is to provide a machine as stated wherein the completion of the grinding of the stone to a predetermined extent will be signaled to the operator by means incorporated in an electrical circuit closed responsively to engagement of a contact against the cutting disk or wheel, with said wheel providing a ground whereby to close a circuit through a signal means of the audible or visible type.

Still another object is to provide a machine of the nature referred to which will be so designed as to permit the closing of the electrical circuit to be effective to shift the dop thereof bodily out of contact with the cutting disk.

A further object is to incorporate in a diamond cutting machine a dop support means that will be universally adjustable upon a stationary base, and swiftly clampable in selected positions of adjustment, through the medium of a novelly designed series of adjustment screws spaced both longitudinally and transversely of the dop support means, with said screws being individually associated with adjacent clamping screws for insuring that the selected position of adjustment will be retained.

Another object is to provide, in association with a contact engageable directly with a cutting disk for the purpose of closing an electrical circuit at the exact time the cutting operation is completed, an electrically actuated latch that will normally hold the dop stand in operative relation to the cutting disk, but which will release the dop stand for movement under pressure of a spring means to an inoperative position, on completion of the particular cutting operation.

Another object is to provide a contact assembly for closing a circuit used to signal the completion of, or halt completely, the step of grinding a particular surface of a stone, which contact assembly will be novelly designed to insure accurate control, within a very narrow range, of the closing of the circuit.

Still another object is to provide a contact assembly, as described immediately above, which will be so designed as to be adjustable to selected positions relative to the dop, thereby to cooperate with the dop adjustment means in effecting the grinding of a particular surface of the stone to a selected angle and depth.

A further object is to provide a machine as described which will be adapted for polishing of the stone after completion of the grinding operation, without requiring resetting of the parts of the machine and to polish the stone automatically and remove the stone at the end of polishing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a cutting table and of a diamond cutting machine formed in accordance with the invention, additional cutting machines being removed from the table.

Fig. 2 is an enlarged sectional view taken radially through the cutting table, and showing the machine in side elevation on an enlarged scale.

Fig. 3 is a transverse sectional view taken substantially on line 3—3 of Fig. 2.

Fig. 4 is a fragmentary transverse sectional view on the same cutting plane as Fig. 3, showing a position to which the dop stand may be adjusted.

Fig. 5 is an enlarged, detail view through the pot showing a supported diamond in elevation.

Fig. 6 is a perspective view of the machine.

Fig. 7 is a top plan view of the machine per se.

Fig. 8 is a greatly enlarged, fragmentary view, partly in section and partly in elevation, of the contact assembly of the machine.

Fig. 9 is an elevational view of the contact assembly taken from the right of Fig. 8.

Fig. 10 is a sectional view on line 10—10 of Fig. 9.

Fig. 11 is a fragmentary elevational view showing an adjusted position of the diamond and contact assembly.

Fig. 12 is a view similar to Fig. 8, showing a modified form of contact assembly.

Fig. 13 is a sectional view on line 13—13 of Fig. 12.

Fig. 14 is a longitudinal sectional view through a modified form of diamond cutting machine, having incorporated therein a latch controlled means for shifting the device to an inoperative position.

Fig. 15 is an end elevational view taken from the right of Fig. 14.

Fig. 16 is a transverse sectional view taken on line 16—16 of Fig. 14, on an enlarged scale.

Fig. 17 is a sectional view on line 17—17 of Fig. 14.

Designated generally at 20 is a rectangular, horizontal, flat cutting table having a centrally disposed, circular well 22 in which is rotatably mounted a cutting disk or wheel 24. These are conventional, and do not per se constitute part of the present invention.

The machine constituting the present invention has been designated generally at 26, and in the illustrated example of the invention, four identically constructed machines 26 would be spaced about the well upon the cutting table, each machine having its dop extending into the well.

The machine 26 has been shown as including a flat, relatively narrow base plate 28 arranged radially of the well 22. The base plate is fixedly secured to the table 20, and underlies a support plate 30 corresponding in size and shape to the base plate.

The support plate is adjustable upon the base plate, being rockable both longitudinally and transversely thereof to selected angular relationships as regards the base plate. This will, in effect, mount the support plate, and the components carried thereby, universally upon the cutting table and will insure, in this manner, that the diamond will be readily positioned at a selected angle to the plane of the cutting disk, for grinding of a particular surface of the diamond.

To provide the desired adjustable mounting of the support plate, there are formed therein threaded openings 32, arranged in a peripheral series, with two openings at the ends of the support plate aligned with the longitudinal center line thereof, and the other openings being arranged along the side edges in pairs wherein the openings of each pair are transversely aligned. The pairs of openings are spaced longitudinally of the support plate. Two pairs are shown in the particular example, but more can be used if desired.

Threaded in the openings 32 are adjusting screws 34, having rounded lower ends. These can be threaded in their associated openings to a selected extent, thus to tiltably adjust the position of the support plate to be parallel with the surface of the grinding wheel. A wide range of adjustments is permissible, and this is of course a highly desirable feature, since it allows grinding and polishing of all facets, the table, etc., of the diamond without requirement on the part of the operator of changing the dop of the machine, regardless of the shape to which the diamond is being cut. If the position of the dop has to be changed so that the grain of the diamond is parallel with the turning of the grinding wheel the facet that is being cut will still be parallel with the surface of the grinding wheel.

To preserve the adjustment of the support plate, elongated studs 36 are positioned loosely in smooth-walled openings 38, and are threaded at their lower ends into threaded openings of the base plate. Nuts 40 are threaded on the studs and are tightened against the support plate after the adjustment has been made, as shown in both Figs. 3 and 4. In this way, the support plate is clamped in each of its adjusted positions, to prevent loss of the adjustment.

A channeled, elongated stand 42 is spaced above the support plate. This is adjustable toward and away from the support plate, but remains in a plane paralleling that of the support plate regardless of the position to which the support plate is adjusted. The adjustment is made through the medium of a screw 44 swiveled at its lower end in the support plate.

Screw 44 is rigid with a peripherally knurled, flat, large diameter hand wheel 46 located in the space between the stand and support plate. The upper end portion of the screw is threaded in an opening 45 centrally provided in the web of the channeled stand.

Guiding the stand in its movement toward and away from the support plate is a series of rectangularly spaced posts 48 having at their upper ends collars 50. Collars 50, could, if desired, be formed as nuts threaded upon the posts so as to be capable of being tightened against the web of the channeled stand in each position to which the stand is adjusted relative to the support plate. The posts are, of course, slidable within correspondingly spaced smooth-walled openings of the web portion of the stand.

Extending between the opposite side walls of the stand, at the front end thereof, is a cross bar 51 fixed at its ends to said side walls to reinforce the stand construction.

A tongue 52 rests upon the stand, and can be of any suitable material, whether metal, wood, or some other material considered suitable. The tongue 52 is of elongated, trough-like formation, and at one end is integrally formed with a cross head 54 which is also channeled out as necessary. The channeled formation of the tongue and its associated cross head is to permit the selective distribution of weights (not shown) therein, thereby to balance the tongue properly in mutually perpendicular vertical planes on the channeled stand during use of the machine, with the tongue being held in proper position on the stand through the location of a selected number and size of weights longitudinally of the trough of the tongue and throughout the length of the cross head.

To hold the tongue against lateral and longitudinal deviation from its assigned position on the channeled stand, there are provided stops 56 each compositely formed from a plurality of plate members fixedly connected in an inverted U-shaped arrangement. The stops straddle the side walls of the stand and are fixedly secured in selected positions taken longitudinally of the side walls, by set screws 58. They engage the opposite sides of the tongue, to hold the same against lateral deviation, and one of the stops also engages the cross head, to hold the tongue against movement in the direction of its length from its assigned position toward the cutting disk. Cutting disks of diamond cutting apparatus rotate clockwise, and thus there is a continuing tendency to pull the weighted tongue laterally from its proper position.

Pivotally connected to the tongue by a pin 60 is the mid-length portion of the bight of a yoke 62 of inverted U-shape, between the depending arms of which a dop assembly generally designated 64 is pivotally mounted on hinge pins 66 carried by the yoke arms. The dop assembly pivots about an axis normal to the pivot axis of the yoke, thus mounting the dop assembly for universal adjustment relative to the tongue. A slot 68 in one of the yoke arms has a threaded stud extending therethrough, on which is threaded a wing nut 70 that binds against the adjacent yoke arm to hold the dop assembly in a selected position of adjustment.

Comprising a part of the dop assembly is a protractor segment 72, degree-marked to facilitate adjustment of the assembly to a selected angle, said segment shifting relative to an associated index arm 74 secured to the yoke arm.

The dop assembly includes a block 76 on which the segment 72 is fixedly mounted, and depending from the block is a dop 78. It should be noted that the particular formation and relative arrangement of the block and its associated dop are not new per se, and possibly the dop may be rotatably adjustable upon the block as well as axially shiftable thereon.

Mountable within and depending from the dop is a pot 80, this being removable for substitution of different types of pots selected according to the size and general shape of a stone 82 received therein.

Mounted in the block 76 for engaging the stone at opposite sides thereof are hook-like arms 84 bodily adjustable toward and away from one another, and swingable into engagement with the stone in each position of adjustment, through the medium of a knurled screw 85 rotating within a bracket secured to the block.

The stone is additionally held by a finger 86 having a longitudinal slot receiving the lower end of a stem 88 axially adjustable in block 76 by means of a nut 90. Finger 86 is adjustable in the direction of its length into and out of engagement with the stone, and is additionally shiftable upwardly and downwardly by axial adjustment of the stem. The finger, its mounting, the arms 84, and their mounting, are all conventional per se.

A contact assembly generally designated 92 is carried by the block as part of the invention, and in Figs. 8-11 is shown as including a pair of elongated spring contact members 94, 96 of different widths having their lower, free ends curved in the direction of the stone to terminate in closely spaced relation to said stone. The members 94, 96 are in longitudinal contact with each other for their full lengths, the reason being member 96 is for signaling that the end of cutting has been reached and member 94 is to lift and remove the dop containing the stone from the polishing wheel.

The upper end portions of the contact members are slidably adjustable within a dovetail groove 98 (Fig. 10) formed in a contact member support block 100 having ears 102 at its opposite sides (Fig. 9) through which extend screws 104 threaded into dop 78 to fixedly mount the block 100 on the dop, on the rear surface of said dop. A rectangular, flat washer 106 of electrically insulative material such as fiber is interposed between the block 100 and the dop. The screws 104 would also be formed of insulative material, to cooperate with the washer 106 to insulate the contact members and their associated block 100 from the dop.

Contact members 94, 96 are fixedly secured to a relatively narrow contact support plate 108 by screws 110, one of which is used as a terminal screw for an electrical conductor 112. At its upper end the plate 108 is integrally formed with a rearwardly projecting enlargement 114 having a threaded bore in which is engaged an adjusting screw 116 rotatable in a smooth-walled opening formed in a flat bracket 118 located above the block 100 and secured to dop 78. The bracket 118 has ears 120 at opposite sides thereof apertured for the extension of screws 122 therethrough, said screws being of electrically insulative material and passing through the washer 106 for threaded engagement in the dop.

Rotation of screw 116 is effective to shift the contact members in the direction of their lengths, thus to locate the sharpened, tapered tips thereof at a selected location relative to the stone being cut. In the example given in Fig. 8, for instance, the table 124 of the stone 82 is being ground down, to a level predetermined by the location of the inwardly curved tips of the contact members. It will be understood that as the grinding proceeds, the tips of the contact members will come closer and closer to the surface of the grinding wheel 24, until they ultimately make contact with said wheel. Contact will be made at the moment the stone has been ground down to the extent desired, and as a result, any suitable electrically actuated signal can be energized to inform the worker of the fact that the stone has been ground to the necessary extent. The worker will then lift the tongue to remove the stone from engagement with the grinding wheel.

It may be noted that in the illustrated example of the invention, a single lead extends to the contact assembly, said lead extending from a suitable source of electric energy. When the tips of the contact members engage the grinding wheel, a circuit is closed through the contact members, since the wheel is a ground therefor. As a result, a signal device 125, such as a buzzer, a bell, or a light, that is in circuit with the contact members and with said source of electrical energy, is actuated. This circuit is conventional and is illustrated in the patent to Coleman, 802,368, or the patent to Bartnovsky 2,395,952.

The device will operate with full efficiency regardless of the surface of the stone that is to be ground. Thus, as shown for example in Fig. 11, a facet 126 of the stone can be ground down to a selected extent, the dop and contact assembly being tiltably adjusted through the medium of the support plate adjusting screws 34. In all instances, the tops of the contact members will be spaced closely from the surface being ground, to increase the accuracy of the setting of the machine.

In Figs. 12 and 13, a modified form of contact assembly, generally designated 128 is shown for grinding wheels that are not electric conductors such as Carborundum or other stone grinding wheels. This includes a metal tube 130 which is secured by means of a clamping bracket 132 having spring clamp arms embracing between them the upper end portion of the tube. The clamp arms are formed with ears apertured to receive screws 134 threaded in the dop. A clamp screw 136 extends through aligned openings formed in the outer ends of the clamp arms, and is provided with a nut whereby to bind the clamp arms against the tube, after the tube has been adjusted in the direction of its length to selected positions relative to the surface of the grinding wheel 24.

Engaged within the tube is an insulated conductor 138, which can itself be adjusted longitudinally of the tube, in each position to which the tube is adjusted. After adjustment of the conductor, it is held in position by a set screw 140 threaded in the tube side wall.

Within the tube, the conductor is provided, at its lower end, with a bared conductive tip 142 normally spaced closely from and above a metal ball 144 supported in a seat 146 formed at the lower end of the tube. The ball projects out of the tube, but is held by the seat against movement beyond the position shown, outwardly of the tube. The ball can, however, shift inwardly of the tube, against the conductive tip.

In use of the modified contact assembly, one would shift the tube 130 to selected positions, to pre-set the assembly at a location at which it will signal the grinding of the stone. In other words, as the grinding proceeds, the ball will first come into contact with the grinding wheel surface and indicate audibly and visually that the grinding operation is nearing completion. During further grinding the rotating wheel will cause the ball to move inwardly into the tube while continuing to emit audible and visual indications of the contact of the ball and wheel. Finally the ball will make contact with tip 142. This will cause an electrical circuit to be closed through the ball and tip and signal that the grinding operation is completed.

The adjustment of the electrical conductor within the tube permits one to pre-set the gap between the ball and the conductive tip, as desired, and in some instances, the adjustment of the conductor can alone be used to pre-set the device as necessary relative to the stone and the grinding wheel. This would be particularly true when only a small amount of grinding is necessary. The tube and the conductor could be suitably calibrated to facilitate the pre-setting of the contact assembly, and the same is true of the block 100 in the first form of contact assembly.

In Figs. 14–17 there is shown a modified form in which there is incorporated a means cooperating with the contact assembly to automatically shift the stone out of engagement with the grinding wheel at the completion of the operation without, however, affecting the previously determined adjustment of the dop. In other words, the movement of the stone out of engagement with the wheel does not prevent the worker from inserting in its place another stone which is to be ground down to the same extent.

In any event, the means mentioned above includes a pivotal connection between the tongue 52 and the channeled stand 42. Referring to Fig. 14, a cross piece 148 extending between the side walls of the stand 42 at that end thereof remote from the dop has a large diameter opening 150 in which is loosely positioned a pin 152 extending through an opening 154 provided in the cross head 54. This permits the end of the tongue remote from the cross head to pivot upwardly off the stand 42.

The upwardly swingable end portion of the tongue has a downwardly facing, annular spring seat 156 secured to its underside, and engaged in said seat is the upper end of a coil spring 158, the lower end of which is engaged within an upwardly facing, annular spring seat 160 secured to the web of the stand 42. The spring is held under compression between the tongue and said web, to supply the force necessary to swing the tongue upwardly off the stand.

Latch means is provided, that normally holds the tongue against upward swinging movement, this being shown to advantage in Fig. 17. The latch means includes a latch member 162 having at its upper end an apertured lateral extension receiving a connecting screw threaded into the underside of the tongue 52, intermediate the ends of the tongue 52. The latch member 162 depends from the tongue 52 within the channeled stand 42, and has at its lower end a notch 164 (Fig. 14) in which is normally engaged the armature 166 of a solenoid 168 mounted on the web of the stand 42 below the tongue 52.

The solenoid 168 would be in circuit with the contact assembly 92 or 128, as the case may be, so as to be energized as soon as the grinding has proceeded to the predetermined point. On energizing of the solenoid 168, the armature 166 would be withdrawn out of engagement in the notch 164, thus freeing the tongue 52 for upward swinging movement under the force of the spring 158, thereby to shift the dop and the stone out of engagement with the grinding wheel.

The construction is, in every instance, such as will allow the polishing of the stone at the completion of the grinding operation to automatically shift out of engagement with the grinding wheel, without requiring resetting of the parts of the apparatus. It is merely necessary that the diamond, after the grinding of a particular surface thereof is completed, be placed on the polishing line of the wheel 24, for polishing of said surface. No readjustments are necessary.

It is also to be noted that a plurality of stones can be ground and polished, following successively one upon the other, each stone being identically treated through the preservation of the adjustments of the machine. This is true regardless of the form of the invention being used.

The device can, of course, be used for grinding or cutting, and polishing, not only diamonds but other precious or semi-precious stones, and can also be used for cutting glass or crystal prisms such as those used as "drops" on chandeliers, lamps, etc.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In diamond cutting apparatus the combination, with a cutting disk, of a base, a stand adjustably mounted thereon, a dop carried by said stand, and a contact assembly adjustably mounted on said dop and arranged to contact said disk responsive to cutting of a stone to an extent predetermined by adjustable positioning of said contact assembly, the contact assembly including a hollow tube carried by the dop and having a ball seat at one end thereof, an electrically conductive ball rotatably positioned on said seat and movable against the cutting disk, said ball being shiftable in said tube, and a conductor member within the tube normally spaced from the ball, said ball contacting the conductor member on shifting of the ball inwardly of the tube responsive to contact of the ball with the cutting disk, whereby first audible and visual signals will be emitted by and during contact of the ball with the disk to indicate the cutting of the stone is nearing completion, and another electrically actuated signal will be emitted upon contact of the ball with said member to indicate the completion of the cutting of the stone.

2. In diamond cutting apparatus the combination, with a cutting disk, of a base, a stand adjustably mounted thereon, a dop carried by said stand, and a contact assembly adjustably mounted on said dop and arranged to contact said disk responsive to cutting of a stone to an extent predetermined by adjustable positioning of said contact assembly, the contact assembly including a hollow tube carried by the dop and having a ball seat at one end thereof, an electrically conductive ball rotatably positioned on said seat and movable against the cutting disk, said ball being shiftable in said tube, and a conductor member within the tube normally spaced from the ball, said ball contacting the conductor member on shifting of the ball inwardly of the tube responsive to contact of the ball with the cutting disk, said conductor member being adjustable longitudinally of the tube to effect adjustments in the spacing between the conductor member and ball, whereby first audible and visual signals will be emitted by and during contact of the ball with the disk to indicate the cutting of the stone is nearing completion, and another electrically actuated signal will be emitted upon contact of the ball with said member to indicate the completion of the cutting of the stone.

3. In diamond cutting apparatus the combination, with a cutting disk, of a base, a stand adjustably mounted thereon, a dop carried by said stand, and a contact assembly adjustably mounted on said dop and arranged to contact said disk responsive to cutting of a stone to an extent predetermined by adjustable positioning of said contact assembly, the contact assembly including a hollow tube carried by the dop and having a ball seat at one end thereof, an electrically conductive ball rotatably positioned on said seat and movable against the cutting disk, said ball being shiftable in said tube, and a conductor member within the tube normally spaced from the ball, said ball contacting the conductor member on shifting of the ball inwardly of the tube responsive to contact of the ball with the cutting disk, said tube being adjustable on the dop in the direction of the cutting disk to predetermine the distance the ball is to be spaced away from the disk prior to cutting of a stone carried by the dop, whereby first audible and visual signals will be emitted by and during contact of the ball with the disk to indicate the cutting of the stone is nearing completion, and another electrically actuated signal will be emitted upon contact of the ball with said member to indicate the completion of the cutting of the stone.

4. In diamond cutting apparatus the combination, with a cutting disk, of a base, a stand adjustably mounted thereon, a dop carried by said stand, and a contact assembly adjustably mounted on said dop and arranged to contact said disk responsive to cutting of a stone to an extent predetermined by adjustable positioning of said contact assembly, the contact assembly including a hollow cylindrical tube carried by the dop and having a ball seat at one end thereof, an electrically conductive ball rotatably positioned on said seat and engageable against the cutting disk, an insulated conductor member disposed longitudinally within the tube and having an exposed end therein normally spaced from the ball, said member extending out of the other end of the tube, said ball contacting said exposed end of the conductor member on shifting of the ball inwardly of the tube responsive to engagement of the ball by the cutting disk, said tube being adjustable on the dop in the direction of the cutting disk to predetermine the distance the ball is to be spaced away from the disk prior to cutting of a stone carried by the dop, the conductor member being longitudinally adjustable within the tube in the same direction as the tube is adjustable, whereby first audible and visual signals will be emitted by and during contact of the ball with the disk to indicate the cutting of the stone is nearing completion, and another electrically actuated signal will be emitted upon contact of the ball with said member to indicate the completion of the cutting of the stone.

5. In a diamond cutting apparatus including a grinding wheel, the combination comprising a base plate, a supporting plate adjustably mounted thereon, an adjustable channeled stand carried by the supporting plate, said stand having parallel side walls disposed perpendicular to said supporting plate, an elongated tongue having a long crosshead arranged therewith in approximately a T-shaped formation, said tongue and crosshead being formed with an open top T-shaped trough providing a cavity for selective distribution of weights in the trough to balance the tongue and crosshead in mutually perpendicular vertical planes on the stand, said tongue and crosshead being adjustably mounted on the stand, a dop carried by said tongue to support a gem in a selected position for grinding a selected surface of the gem by said wheel, a pair of inverted U-shaped plate members respectively straddling the side wall of the stand to limit the tongue against movement in lateral directions relative to said walls of the stand, said U-shaped members being slidably adjustable in positions along said walls, and means carried by said dop and arranged to contact said wheel to indicate the state of completion of the grinding of said surface.

6. In a diamond cutting apparatus including a grinding wheel, the combination comprising a base plate, a supporting plate adjustably mounted thereon, an adjustable channeled stand carried by the supporting plate, said stand having parallel side walls disposed perpendicular to said supporting plate, an elongated tongue having a long crosshead arranged therewith in approximately a T-shaped formation, said tongue and crosshead being formed with an open top T-shaped trough providing a cavity for selective distribution of weights in the trough to balance the tongue and crosshead in mutually perpendicular vertical planes on the stand, said tongue and crosshead being adjustably mounted on the stand, a dop carried by said tongue to support a gem in a selected position for grinding a selected surface of the gem by said wheel, a pair of inverted U-shaped plate members respectively straddling the side wall of the stand to limit the tongue against movement in lateral directions relative to said walls of the stand, said U-shaped members being slidably adjustable in positions along said walls, means carried by said dop and arranged to contact said wheel to indicate the state of completion of the grinding of said surface, said means comprising a contact assembly, and latch controlled means releasably responsive to closing of a circuit through said assembly and wheel to shift the dop away from said wheel.

7. In a diamond cutting apparatus including a grinding wheel, the combination comprising a base plate, a supporting plate adjustably mounted thereon, an adjustable channeled stand carried by the supporting plate, said stand having parallel side walls disposed perpendicular to said supporting plate, an elongated tongue having a long crosshead arranged therewith in approximately a T-shaped formation, said tongue and crosshead being formed with an open top T-shaped trough providing a cavity for selective distribution of weights in the trough to balance the tongue and crosshead in mutually perpendicular vertical planes on the stand, said tongue and crosshead being adjustably mounted on the stand, a dop carried by said tongue to support a gem in a selected position for grinding a selected surface of the gem by said wheel, a pair of inverted U-shaped plate members respectively straddling the side wall of the stand to limit the tongue against movement in lateral directions relative to said walls of the stand, said U-shaped members being slidably adjustable in positions along said walls, and means carried by said dop and arranged to contact said wheel to indicate the state of completion of the grinding of said surface, said means comprising a hollow cylindrical tube carried by said dop, a ball rotatably disposed in said tube and having a portion extending therefrom to contact said wheel, and an electrically conductive member disposed in said tube, said ball normally out of contact with said conductive member and being movable upwardly in said tube to contact said conductive member to actuate an alarm, whereby said ball indicates audibly and visually by rotation against said wheel that the grinding of said surface is nearing completion and the completion of said grinding of the surface is indicated by said alarm when the ball contacts said conductive member.

References Cited in the file of this patent
UNITED STATES PATENTS

| | | |
|---|---|---|
| 677,613 | Armeny | July 2, 1901 |
| 802,368 | Coleman | Oct. 24, 1905 |
| 1,249,068 | Gramm | Dec. 4, 1917 |
| 2,023,494 | Strieby | Dec. 10, 1935 |
| 2,395,952 | Bartnovsky | Mar. 5, 1946 |
| 2,414,126 | Sevin | Jan. 14, 1947 |
| 2,658,313 | Bowen | Nov. 10, 1953 |